(12) United States Patent
Hu et al.

(10) Patent No.: US 12,104,914 B2
(45) Date of Patent: Oct. 1, 2024

(54) SYSTEMS AND METHODS FOR ENTERTAINMENT RECOMMENDATIONS DURING CHARGE OF A BATTERY ELECTRIC VEHICLE

(71) Applicant: Ford Global Technologies, LLC, Dearborn, MI (US)

(72) Inventors: Jeffrey Yizhou Hu, Ann Arbor, MI (US); Michael Crimando, Birmingham, MI (US); Robin Mathew Kurian, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 17/804,504

(22) Filed: May 27, 2022

(65) Prior Publication Data

US 2023/0384105 A1 Nov. 30, 2023

(51) Int. Cl.
| | |
|---|---|
| *G01C 21/34* | (2006.01) |
| *B60L 1/00* | (2006.01) |
| *B60L 50/60* | (2019.01) |
| *B60L 53/66* | (2019.01) |
| *B60L 58/12* | (2019.01) |

(52) U.S. Cl.
CPC ............ *G01C 21/3469* (2013.01); *B60L 1/00* (2013.01); *B60L 50/60* (2019.02); *B60L 53/665* (2019.02); *B60L 58/12* (2019.02)

(58) Field of Classification Search
CPC ........ B60L 50/60; B60L 58/12; B60L 53/665; B60L 1/00; G01C 21/3469
See application file for complete search history.

(56) References Cited

U.S. PATENT DOCUMENTS

| | | | |
|---|---|---|---|
| 7,986,126 B1 * | 7/2011 | Bucci | B60L 53/14 |
| | | | 320/109 |
| 9,448,083 B2 | 9/2016 | Loftus et al. | |
| (Continued) | | | |

FOREIGN PATENT DOCUMENTS

| | | |
|---|---|---|
| CN | 113141398 A | 7/2021 |
| JP | 4466728 B2 | 5/2010 |
| (Continued) | | |

OTHER PUBLICATIONS

Ford, Explore the FORDPASS App, Malloy Ford of Charlottesville, 1-2.

*Primary Examiner* — Seth A Silverman
(74) *Attorney, Agent, or Firm* — Joseph Zane; Eversheds Sutherland (US) LLP (57) ABSTRACT

The disclosure is generally directed to systems and methods related to charging an electric vehicle. A method for determining recommendations for a user of a user device includes determining that the user is consuming content on a first application on the user device, the content available on the electric vehicle, determining a charge state of the electric vehicle, determining, based on the charge state of the electric vehicle that a length of time to charge the electric vehicle satisfies a timing requirement associated with the content, locating a charge station where the electric vehicle can be charged while the vehicle plays the content, and presenting a recommendation to charge the vehicle at the charging station.

18 Claims, 4 Drawing Sheets

(56) References Cited

U.S. PATENT DOCUMENTS

2008/0252251 A1* 10/2008 Joasil .................... H02J 7/0042
320/101
2014/0316939 A1* 10/2014 Uyeki ....................... B60L 3/12
705/26.9
2020/0242421 A1* 7/2020 Sobhany ................. G06F 18/24

FOREIGN PATENT DOCUMENTS

JP      2013027161 A    2/2013
WO      2014075889 A2   5/2014

* cited by examiner

SYSTEMS AND METHODS FOR ENTERTAINMENT RECOMMENDATIONS DURING CHARGE OF A BATTERY ELECTRIC VEHICLE

FIELD OF THE DISCLOSURE

This disclosure generally relates to vehicles, and more particularly relates to systems and methods for providing entertainment recommendations appropriate during a charge of a battery electric vehicle.

BACKGROUND

Battery Electric Vehicles (BEV) require charging. Some owners of battery electric vehicles do not charge their vehicle at their homes and rely on outside locations. When charging their electric vehicles some owners may occupy themselves within the vehicle. Some of the activities owners may engage in include video games, movies, conferencing calls, and the like. Identifying which location for charging a BEV with the best entertainment options is currently difficult because charging locations do not have a priori knowledge of the needs of a user.

It is desirable to provide solutions that address the need for an efficient use of time during charging of electrified vehicles.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, this disclosure is generally directed to systems and methods for charging a battery electric vehicle. More specifically, this disclosure is related to presenting entertainment options and recommendations to a user of a device associated with an electric vehicle to make charging a BEV more productive and enjoyable.

In one or more embodiments, a method for determining recommendations for a user of a user device associated with an electric vehicle, includes determining that the user is consuming content on a first application on the user device, the first application available on the electric vehicle, determining a charge state of the electric vehicle, determining, based on the charge state of the electric vehicle that a length of time to charge the electric vehicle satisfies a timing requirement associated with the content, locating a charge station where the electric vehicle can be charged while the vehicle plays the content, and presenting a recommendation to charge the vehicle at the charging station.

In one or more embodiments, the determining that the user is consuming content on the first application on the user device, the first application available on the electric vehicle includes receiving a content identifier identifying the content being consumed by the user and a marker identifying a time period associated with the content.

In one or more embodiments, presenting recommendations includes comparing at least data connection options, cost, the length of time to charge, and location associated with a plurality of available charging stations including available connectivity options at the plurality of available charging stations and filtering the data connection options, the length of time to charge e, cost and location associated with the plurality of available charging stations according to predetermined thresholds.

In another embodiment, an electrified vehicle includes a processor coupled to provide instructions for charging and discharging the one or more batteries, a memory that stores instructions coupled to the processor. The processor executes the instructions to determine a charge state of the electric vehicle, receive a content identifier related to a user is consuming content on a first application on a user device, the first application available on the electric vehicle, determine based on the charge state of the electric vehicle that a length of time to charge the electric vehicle satisfies a timing requirement associated with the content, locate a charge station where the electric vehicle can be charged while the vehicle plays the content, and present a recommendation to charge the vehicle at the charging station, the recommendation including charging costs and available data connection options that enable the user of the first application on the user device to continue consuming content while charging the electric vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a nomadic device such as a smartphone, refers to code (software code, typically) that is installed in the nomadic device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electrified vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

Figure 1:
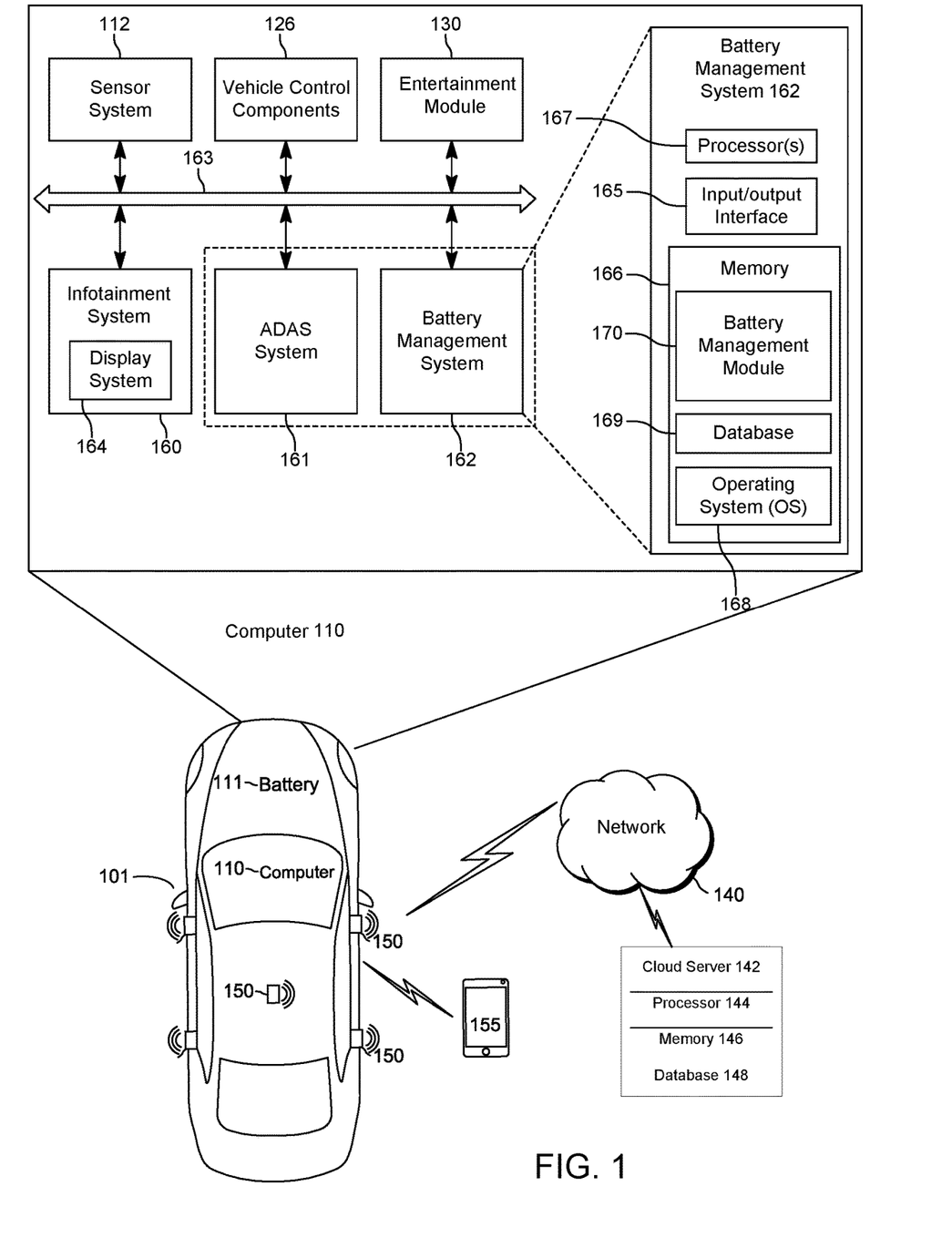
FIG. 1 illustrates an example electrified vehicle in accordance with and embodiment of the disclosure.

FIG. 1 illustrates an example system 100 that includes an electric vehicle 101 configured with a computer 110, battery 111, sensors 150 in accordance with an embodiment of the disclosure. Electric vehicle 101 requires charging at a charging station, which may be implemented in a variety of ways to include components that are accessible via a communications network 140, such as user device 155 used by a user associated with electric vehicle 101. The computer 110, in one or more embodiments, and may perform various functions such as controlling engine operations (speed control, braking, etc.), managing climate controls (air conditioning, heating etc.), activating airbags, and issuing warnings (check engine light, bulb failure, low tire pressure, vehicle in a blind spot, etc.). The computer 110, in one or more embodiments, may be used to support features such as passive keyless operations, remotely-controlled vehicle maneuvering operations, and remote vehicle monitoring operations. Computer 110, in one or more embodiments, may execute certain operations associated with entertainment options while charging that are available to users of electric vehicle 101 in accordance with the disclosure. The computer 110 is illustrated as a single computer, but may comprise multiple computers for providing the functions described herein.

Network 140 in one embodiment connects electric vehicle 101 and user device 155 to a cloud computing component. More specifically, in one or more embodiments, a recommendation for that appears on user device 155 on a display for a user may be received from a cloud server over network 140. For example, cloud server 142 may include data that may compare available data connection options at a plurality of available charging stations to generate a list of available charging stations, including charging costs and available data connection options. In other embodiments, user device 155 may have an application on board that pulls data from cloud server 142 to generate a recommendation for a user.

As shown, cloud server 142 includes a processor 144, memory 146, database 148 and a recommendation module 150 configured to collect location data and details concerning charging stations and make recommendation to the user of communications device 155. Memory 146, in one embodiment, includes an application/module such as a module that further receives data from user device 155, which may be stored in database(s) 152 to receive data identifying current applications running on user device 155, and if the application is time limited, such as a video or game, data identifying a time period remaining. Additionally, in one embodiment, cloud server 142, user device 155 or both, may have location services capable of collecting data identifying where user device 155 is located, where vehicle 101 is located, and locations of charging stations. In one or more embodiments, cloud server 142 or an application running on user device 155 may operate as a recommendation engine collects the location data and charging station data and the entertainment applications running on communications device 155 and presents options for continuing applications such as videos and games at a charging station.

FIG. 1 further shows some example components that can be included in vehicle 101 in accordance with an embodiment of the disclosure. The example components can include a sensor system 112, including both internal and external cameras, vehicle control components 126, infotainment system 160 with display system 164 having a GUI which may be used for carrying out various operations including, for example, by a driver to input a level of responsiveness for Driver Assistance System (ADAS) 161 to perform an operation. A further example component may include a battery management system 162. The various components are communicatively coupled to each other via one or more buses such as an example bus 163, which may be implemented using various wired and/or wireless technologies. For example, bus 163 can be a vehicle bus that uses a controller area network (CAN) bus protocol, a Media Oriented Systems Transport (MOST) bus protocol, and/or a CAN flexible data (CAN-FD) bus protocol, or an automotive ethernet system in accordance with IEEE 802.3 and 802.1 specifications using a wired network to connect components with vehicle 101, Some or all portions of the bus 163 may also be implemented using wireless technologies such as Bluetooth®, Bluetooth® Ultra-Wideband, Wi-Fi, Zigbee®, or near-field-communications (NFC).

Sensor system 112 can include various types of sensors such as, for example, a weight sensor, an external and internal camera capable of facial detection, a radar detector, a front-facing camera, and others on vehicle 101. Vehicle control components 126 can include various components and systems associated with driving functions of electric vehicle 101 and its various other functions (such as, for example, stocks and struts whose characteristics can be controlled for varying a performance of vehicle 101). The various components may be controlled, activated, and/or operated by the vehicle computer 110, ADAS 161, and the battery management system 162.

In one implementation, battery management system 162 can be an independent device, a thin client relying on cloud-based application data, or a part of vehicle computer 110. In another implementation, some or all components of battery management system 162 can be housed, merged, or can share functionality, with ADAS 161 and/or the vehicle computer 110 or a cloud server accessible through network. For example, an integrated unit that combines the functionality of battery management system 162 with that of ADAS 161 can be operated by a single processor and a single memory device.

An I/O interface 165 may be configured to provide communications between the components of computer 110, such as between battery management system 162 and other such as sensor system 112, the vehicle control components 126 (for overriding commands issued by ADAS 161 and for providing enhanced operations), infotainment system 160, and entertainment module 130.

Memory 166, which is one example of a non-transitory computer-readable medium, may be used to store an operating system (OS) 168, one or more database(s) (not shown), and various code modules such as an battery management system module 162. The code modules are provided in the form of computer-executable instructions that can be executed by processor 167 for performing various operations in accordance with the disclosure.

Battery management system module 162 may be executed by processor 167 for performing various operations in accordance with the disclosure. For example, battery management system module 162 may operate as a recommendation engine just as cloud server 142 may operate as a recommendation engine, including the recommendation of when to charge based on historical data, such as daily driving habits, calendared events such as trips, day of the week (weekend verses week day), etc. Memory 166 and/or database(s) (not shown) may be used to store information that can be accessed and used by processor 167 when executing the battery management system module 162. As another example, the battery management system 162 may manage the charge, discharge, and general operation of the battery to maximize its efficiency. This may include predicting charge times based on current charge as well as other considerations such as ambient temperature, historical charging data, charger capability (rating, such as amps per minute), etc. The battery management system may also be connected to the CAN bus system or as part of an automotive ethernet.

The function of entertainment module 130 may include entertainment recommendations while charging. Vehicle on board computer 110 may include a display, such as a touchscreen having softkeys (graphical icons), and a biometric component (to enable facial recognition, a fingerprint scanner, or a microphone for voice command input). Operating system 168 can be any of various kinds of software used, for example, as an iOS® operating system, an Android® operating system, or a Windows® operating system.

Memory 166 which is one example of a non-transitory computer-readable medium, may be used to store the OS 168, and various software modules utilized by or to implement features such as entertainment module 130, and battery management module 162 which is one or more modules in the form of computer-executable instructions executed by processor 167 for performing various operations in accordance with the disclosure. More particularly, entertainment module 130 and battery management module 162 may be executed by processor 167 to provide entertainment recommendations while the electric vehicle is charging.

Vehicle computer 110, in one or more embodiments, may execute certain operations associated with facial recognition to allow entry and operation of vehicle systems such as the ADAS system 161 in accordance with the disclosure.

User device 155 is shown as a mobile device or a wireless device of a user that may be using an entertainment or productivity application, but may include a set of wired or wireless communication devices that can communicate with vehicle 101 or with the network 140 in a manner that allows the user device 155 to communicate with the vehicle on-board computer 110. In one or more embodiments, user device 155 can be a home computer, a laptop, a mobile phone, a mobile electronic device, a television, a cable box, an Apple TV, Amazon Fire device or any device capable of instantiating or running the recommendation module 169 that can receive information and transmit information concerning a user's activities, which may include current, past and planned activities utilizing entertainment and/or productivity applications (collectively referred to herein as "entertainment applications") 170 and the like. For example, user device 155 may have a memory 156 that includes entertainment applications 170 such as Netflix, Hulu or Amazon Prime, a productivity application such as Word, a conferencing application such as Zoom, Skype or the like, or a video game such as an interactive game, Twitch, Mario Bros., or Chess, or an online class. In one or more embodiments, the user device 155 may interact with a cloud server 142 over network 140. Thus, the applications 170 running on user device 155 may interact with a recommendation module 169 to communicate with entertainment module 130. This may include receiving information on the content being consumed by the user via one of the entrainment applications 170, such as the identification of a movie the user is viewing via a user interface 174 (e.g., the display and speaker(s) associated with user device 155), as well as the place within the movie that the user is current inly watching, such as a time stamp of time remaining or time elapsed. This information and other information identifying the user device or an account associated with the user device may be communicated by the recommendation module to the server 142 or and/or the entertainment module 130. In some embodiments, the recommendation module 169 of the user device 155 may receive data form the battery management system 162 of the vehicle 101 regarding the charge status of the battery 111 and determine to make a recommendation to the user via the user interface 174 for charging the vehicle battery 111 at a charging station while continuing to consume the content currently being consumed via user device 155 using the vehicle entertainment module 130 and user interface 165 (e.g., display 164) while the vehicle 101 is being charged. The user device 155 may further include a processor 172 and an operating system 168.

In some embodiments, the recommendation module 150 of the server 142 may receive the content information form the user device 155 and the battery charge information from the vehicle 101 and the recommendation may be determined by the recommendation module 150. The recommendation may be communicated to the user device 155 for presentation to the user via the user interface 174 or 164.

In one or more embodiments, sensor system 112 of vehicle 101 may be one or more of Bluetooth®, or Bluetooth® low energy (BLE) sensors, and vehicle on-board computer 110 may use one or more of various wireless technologies in combination with such sensors such as Bluetooth®, Ultra-Wideband (UWB), Wi-Fi, ZigBee®, Li-Fi (light-based communication), audible communication, ultrasonic communication, near-field-communications (NFC), Bluetooth® low energy (BLE) and the like, for carrying out communications.

Vehicle on-board computer 110 may further connect via communications network 140, which may include any one network, or a combination of networks, such as a local area network (LAN), a wide area network (WAN), a telephone network, a cellular network, a cable network, a wireless network, and/or private/public networks such as the Internet. For example, the communications network 140 may support communication technologies such as TCP/IP, Bluetooth®, cellular, near-field communication (NFC), Wi-Fi, Wi-Fi direct, Li-Fi, acoustic or ultrasonic audio communication, Bluetooth Ultra-Wideband (UWB), machine-to-machine communication, and/or man-to-machine communication.

Figure 2:
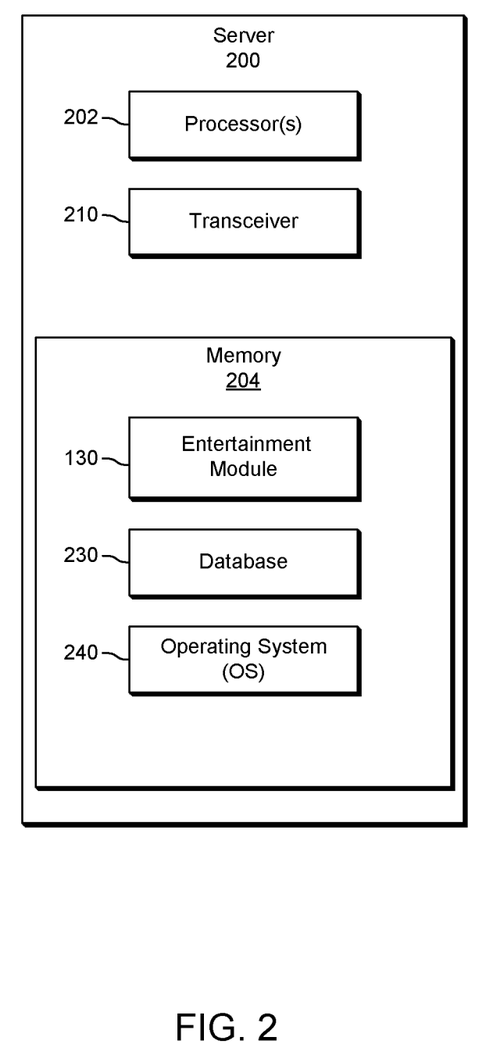
FIG. 2 illustrates some example functional blocks that may provide content recommendations in accordance with an embodiment of the disclosure.

Referring now to FIG. 2, in one or more embodiments, a server 242, which may be the server 142 in FIG. 1, is presented. The server 242 may be communication with user device 155, and vehicle 101, and may include a processor 248, a transceiver 210 and a memory 246. Server 242 may be a cloud server in communication with user device 155, network 140 and vehicle computer 110. For example, server 242 could be server 142 or a server coupled or integrated with user device 155 or a thin server/client associated with vehicle 101.

Memory 246 may include modules such an operating system 282, a recommendation module 250 for making recommendations to the user of user device 155, and a charging station module 280 for tracking information pertaining to charging stations, such as location, charge capacity, charging speeds, costs, available positions, etc. One or more database(s) 252 associated with the server 242 may be configured for storing user data (e.g., user account information associate with the vehicle 101 and/or user device 155), charge station information collected by the charging station module 280, and content consumption data pertaining to the user device 155 and entertainment apps 170. The recommendation module may also collect data from the user device 155 concerning what a user of user device 155 may be watching, planning to watch or logged. The recommendation module 250 may determine a recommendation for the user of user device 155 that is consuming content via an entertainment application 170 on the user device 155 to charge the vehicle 101 at a near-by charging station and continue consuming the content while the vehicle is charging using the entertainment module 130 of the vehicle, which may include an corresponding entertainment application to what the user was using on the user device 155 to consume the content.

Accordingly, the recommendation module can be located at the server 142, the user device 155, or the vehicle 101, or the steps of making the recommendation as disclosure herein may be distributed among recombination modules at various locations.

Figure 3:
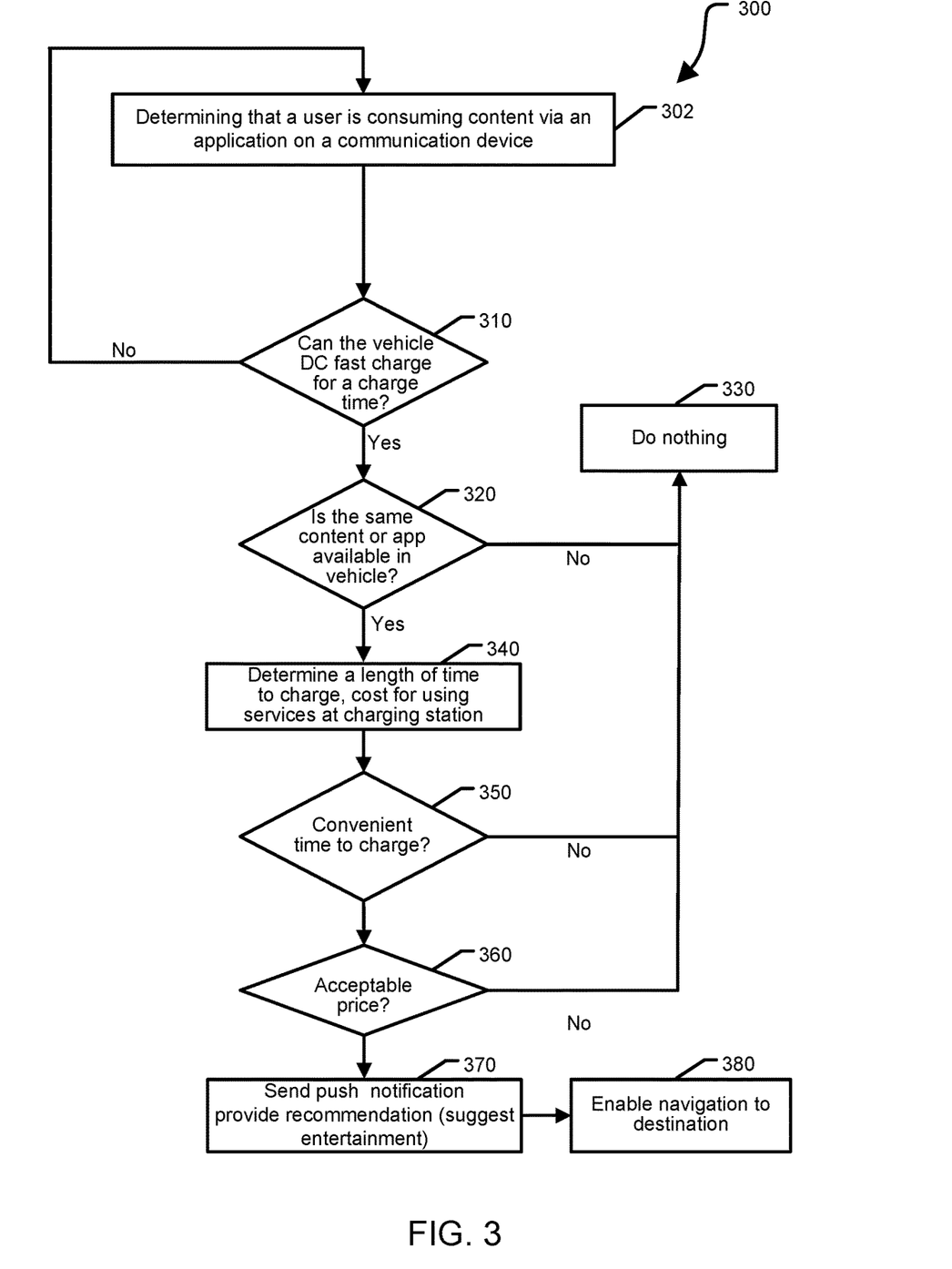
FIG. 3 illustrates a flow diagram of a method in accordance with an embodiment of the disclosure.

FIG. 3 illustrates a decision flow diagram of a method accordance with one or more embodiments for an electric vehicle that may occur when the vehicle is in need of a charge but a user may be occupied with an application on a user device 155. More specifically, FIG. 3 provides a decision flow diagram 300 that may be enabled by entertainment module 130 in combination with user device 155. Decision flow begins with block 302 which provides for determining a user is using an application on a personal device (e.g., a mobile device, television, set top box, streaming device, etc.), such as for video streaming or a video game.

Decision block 310 determines whether the vehicle can DC fast charge for a charge time. If not, the decision flow returns to before block 302. If yes, the decision flow continues to decision block 320 asking whether the same application or same content via another application is available in the electric vehicle, for instance, vehicle 101. If not, the decision flow goes to block 330, do nothing. If yes, the decision flows to block 340, determine a length of time to charge, cost for using the charging services at a charging station. For example, as shown in FIG. 1, a length of time to charge, cost for using the charging services may be available over network connection 140, and collected for charging stations in a vicinity at cloud server 142. For example, an application running on user device 155 may connect with cloud server 142, which uses location services to collect data concerning nearby charging stations with different speed charging costs and options and provide either raw data or compile the data within cloud server 142 to provide a list of relevant charging stations to user device 155.

Next the decision block 350 queries whether the present is a convenient time to charge and view a charge-length entertainment option. For example, cloud server 142 may collect location services data, charge station data, and vehicle 101 requirements to determine how much charge time is required and which charge station may be appropriate for a user watching a particular video, playing a particular video or involved in some activity via user device 155. For example, if a charging station is closer but provides no data connection to continue an entertainment application being watched by a user on user device 155, but a charging station further away that may offer free Wifi and faster charging options, a recommendation may identify the charging station that allows the user to continue watching the particular video. Further, if a user has identified a threshold related to costs or distance, the recommendations may filter any charging stations outside the cost range or distance range predetermined by the user or by rules preloaded on a battery management system or module. For example, battery management system 162 may have user defined rules or preexisting filters that are based on normalized data received over cloud server 142, for example.

If no, block 330 provides for doing nothing, if yes, block 360 asks if the charging station has an acceptable price. For example, acceptable pricing for a user may be predefined based on user preferences, subject to a threshold, or determined by a user application that controls user spending on vehicle 101. In one or more embodiments, the user application may compare charging at a home station versus charging at a fast charging location and determine a cost comparison. Further, if vehicle 101 is a fleet vehicle, an acceptable price may be set by an employer or fleet vehicle owner that will prevent charging in excess of fleet vehicle rules.

If no, block 330 provides for doing nothing, if yes, block 370 provides for sending a push notification suggestion entertainment followed by block 380 provides for enabling navigation to the charging station. For example, a push notification may include a message to a user of user device 155 that identifies charging stations, cost for charging, available connectivity and applications within vehicle 101 that may be available at the charging station via vehicle 101, the location of the charging stations, an estimate of the duration and time saved by fast charging at a particular station and the like. In one or more embodiments, the electric vehicle 101 may also remotely start to facilitate the user to charge the vehicle. Further, the push notification may include an option to enable locations services to direct the vehicle 101 to a preferred recommended location.

Figure 4:
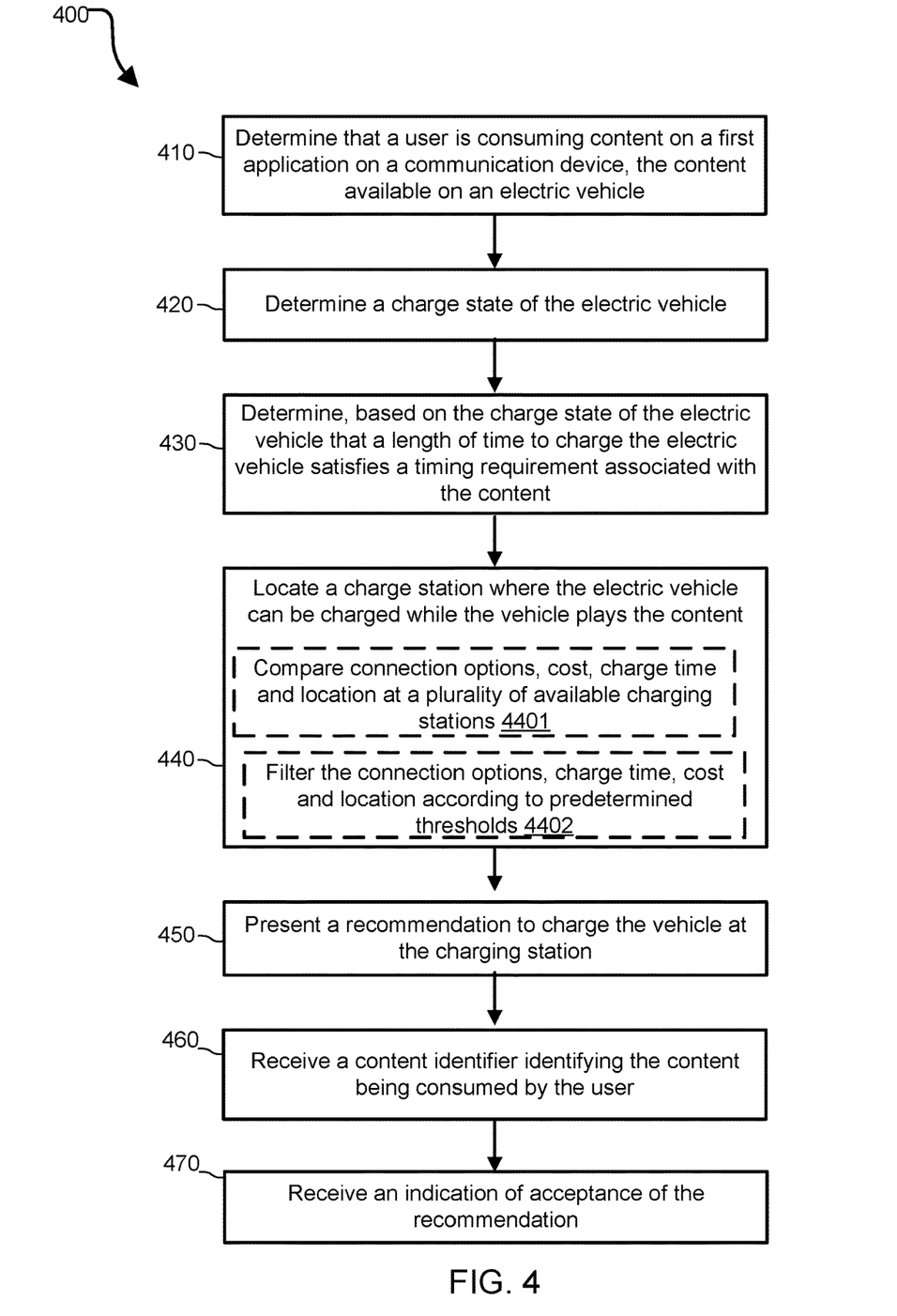
FIG. 4 illustrates another flow diagram of a method in accordance with an embodiment of the disclosure.

Referring now to FIG. 4, a flow diagram illustrates a method in accordance with one or more embodiments. More specifically, flow 400 relates to determining recommendations for a user of a wireless device, such as user device 155 associated with an electric vehicle, such as electric vehicle 101. The method may be implemented with block 410, which provides for determining that a user is consuming content on a first application on a user device, the first application available on an electric vehicle, such as electric vehicle 101. For example, if a user is utilizing user device 155, and electric vehicle 101, then entertainment module 130, recommendation module 169, recommendation module 250, or any combination thereof, may perform the method illustrated in FIGS. 3 and 4. User device 155 may be mobile device, such as a cellular phone, a television, tablet, wearable, or other personal communication device. The content may be an application running a video game, a movie or streaming service or productivity application or the like.

Block 420 provides for determining a charge state of the electric vehicle. For example, battery management system 162 may determine that electric vehicle 101 requires charging.

Block 430 provides determining, based on the charge state of the electric vehicle that a length of time to charge the electric vehicle satisfies a timing requirement associated with the content. For example, entertainment module 130 may interact with battery management system 162 and network 140 to determine that a length of time required to charge coincides with content playing on user device 155. Further, entertainment module 130 may receive a content identifier identifying the content being consumed by the user, and a marker identifying a time period associated with the content.

Block 440 provides for locating a charge station where the electric vehicle can be charged while the vehicle plays the content. For example, locating a charging station may include identifying which have available data connection options such as Wi-Fi and the like. Within block 440 includes optional block 4401 which provides for comparing at least one of connection options, cost, charge time and location at a plurality of available charging stations. For example, comparing may include identifying which charging station is closest and cost effective and also enables the user to continue consuming content. One or more of these parameters may be compared to a respective predetermined threshold values. Optional block 4402 provides for filtering the connection options, charge time, cost and location according to predetermined thresholds. For example, a user may set predetermined thresholds for cost of charging and distance from the location of the electric vehicle. There may also be a minimum charge time before a recommendation is made, a remaining viewing/consumption time remaining with the content, or a preferred charge stations. If the remaining consumption/viewing time left in the content is not sufficient compared to the time required to charge the vehicle, then it may be determined to make a recommendation that includes a recommended second item of content for the user to consume after the current content is complete, and while the vehicle is being charged, such an episode of a series not yet viewed, a movie, etc. that may have a duration approximately equal to the remaining time to complete the charging of the vehicle. For example, entertainment module 130 may compare data lists for available entertainment options within electric vehicle 101 with any active user application on wireless device 155.

Block 450 provides for presenting a recommendation to charge the vehicle at the charging station. For example, electric vehicle 101 and battery management system 162 operating as a recommendation engine, or cloud server 142 operating as a recommendation engine may compile data received charging stations and from user device 155, apply thresholds and determine that the first application is available in electric vehicle 101 and generate recommendations for the user. Further, if there are the same applications available, a recommendation may be to port the application from the wireless device 155 to vehicle 101 to a user. Thus, for example, user applications may include movies, video games, streaming services and productivity applications.

Block 460 provides for receiving a content identifier identifying the content being consumed by the user. For example, if the user is consuming content available in electric vehicle 101, and a recommendation includes a charge station within a desired location that is within a threshold.

Block 470 provides for receiving an indication of acceptance of the recommendation. For example, acceptance of a recommendation may include accepting an offer to port the first application using the content identifier. In one or more embodiments, porting the first application may include recommending an entertainment option that coincides with a charge time. In one or more embodiments, if the entertainment option is available and the electric vehicle supports the first application, electric vehicle 101 may navigate to one of the plurality of available charging stations within a predetermined vicinity.

In one or more embodiments, porting the first application to the electric vehicle may include comparing the charge time to the first application and providing at least one available entertainment recommendation that matches the charge time. In some embodiments, providing available entertainment recommendation that matches the charge time may include providing a push notification to wireless device 155 indicative of an entertainment recommendation that matches the charge time. In some embodiments, determining the charge time required for charging the electric vehicle may include calculating a fast direct current (DC) charge time for the electric vehicle; and determining a wait time associated with each of the available charging stations.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, nomadic devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for determining recommendations for a user of an electric vehicle, the method comprising:
    determining that a user is consuming content using a first application executing on an user device, wherein the content is available for consumption using the electric vehicle;
    determining a charge state of the electric vehicle;
    comparing a length of time to charge the electric vehicle with a remaining time of the content being consumed;
    providing at least one second content recommendation based on the comparison;
    identifying a charge station where the electric vehicle can be charged; and
    causing to present by the user device a recommendation to charge the electric vehicle at the charging station while continuing to consume the content using the electric vehicle.

2. The method of claim 1, wherein determining that the user is consuming content using the first application executing on the user device further comprises:

receiving a content identifier identifying the content being consumed using the user device; and a marker indicative of a time position within the content.

3. The method of claim 1, wherein locating the charge station further comprises at least one of:

comparing at least one of data connection options, cost, the length of time to charge, and location of a plurality of available charging stations at one or more available charging stations; or filtering at least one of data connection options, the length of time to charge, cost and location to respective thresholds to determine the plurality of available charging stations.

4. The method of claim 1, further comprising:

receiving an indication of acceptance of the recommendation, the indication of accepting including location information regarding a recommended charging station.

5. The method of claim 1, further comprising wherein the content is a movie, video game, streaming service or productivity application.

6. The method of claim 1, further comprising:

causing to present, at a completion of the content, at least one available entertainment recommendation that matches a remaining charge time.

7. The method of claim 1, wherein the determining that the length of time to charge the electric vehicle satisfies the timing requirement associated with the content further comprises:

comparing the length of time to charge with the remaining time of the content being consumed; and providing at least one second content recommendation based on the comparison.

8. The method of claim 1, wherein the determining the charge state of the electric vehicle includes:

calculating a fast direct current (DC) charge time for the electric vehicle.

9. An electric vehicle comprising:

a plurality of batteries requiring periodic charging;

a processor coupled to provide instructions for charging and discharging the one or more batteries; and a memory that stores instructions coupled to the processor, wherein the processor executes the instructions to:

determine a charge state of the electric vehicle;

receive a content identifier related to a user is consuming content on a first application on a user device, the content available on the electric vehicle;

determine, based on the charge state of the electric vehicle that a length of time to charge the electric vehicle satisfies a timing requirement associated with the content;

locate a charge station where the electric vehicle can be charged while the electric vehicle plays the content;

present a recommendation to charge the electric vehicle at the charging station, the recommendation including charging costs and available data connection options that enable the user of the first application on the user device to continue consuming content while charging the electric vehicle;

determine that the electric vehicle supports the first application or a second application supportive of the content;

navigate to the charging station within a predetermined vicinity; and port the content to the electric vehicle.

10. The electric vehicle of claim 9, wherein the processor executes the instructions to:

determine a best wireless connectivity option at the charging station from the available data connection options.

11. The electric vehicle of claim 9, wherein the processor executing the instructions to determine the charge state of the electric vehicle further executes instructions to:

calculate a fast direct current (DC) charge time for the electric vehicle.

12. The electric vehicle of claim 9, wherein the first application includes a movie, a video games, a streaming service or a productivity application.

13. The electric vehicle of claim 9, wherein the processor executes the instructions to:

recommend an entertainment option that coincides with the length of time to charge the electric vehicle.

14. The electric vehicle of claim 9, wherein the processor executes the instructions to:

identify among a plurality of available charging stations, a predefined proximity appropriate for the length of time to charge the electric vehicle.

15. The electric vehicle of claim 9, wherein the processor executes the instructions to port the content to the electric vehicle, further executes instructions to:

compare the length of time to charge the electric vehicle to the content; and provide at least one available entertainment recommendation that matches the length of time to charge.

16. A system comprising a memory that stores computer-executable instructions; and a processor configured to access the memory and execute the computer-executable instructions to:

determine that a user is consuming content on a first application executing on a user device, the content is available for consumption using an electric vehicle;

determining a charge state of the electric vehicle;

comparing a length of time to charge the electric vehicle with a remaining time of the content being consumed;

providing at least one second content recommendation based on the comparison;

locate a charge station where the electric vehicle can be charged; and cause to present by the user device a recommendation to charge the electric vehicle at the charging station.

17. The system of claim 16, wherein the processor executes the instructions to:

cause to present at least one available entertainment recommendation that matches a remaining charge time at a completion of the content.

18. The system of claim 16, wherein the user device is a mobile device configured to receive the recommendation from a cloud server.

* * * * *